March 18, 1930.  J. J. BARKER  1,751,122

VALVE

Filed May 16, 1928

Inventor:
John J. Barker,
by Walter E. Lombard,
Atty.

Patented Mar. 18, 1930

1,751,122

UNITED STATES PATENT OFFICE

JOHN J. BARKER, OF ALLSTON, MASSACHUSETTS

VALVE

Application filed May 16, 1928. Serial No. 278,157.

This invention relates to gate valves and has for its object the provision of connecting means between the gate and its adjusting screw whereby the gate may be moved to its seat by said screw and further movement of said gate prevented regardless of further rotation of said screw.

This object is attained by the mechanism illustrated in the accompanying drawing.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings.

Similar characters indicate like parts throughout the several figures of the drawings.

Figure 1:
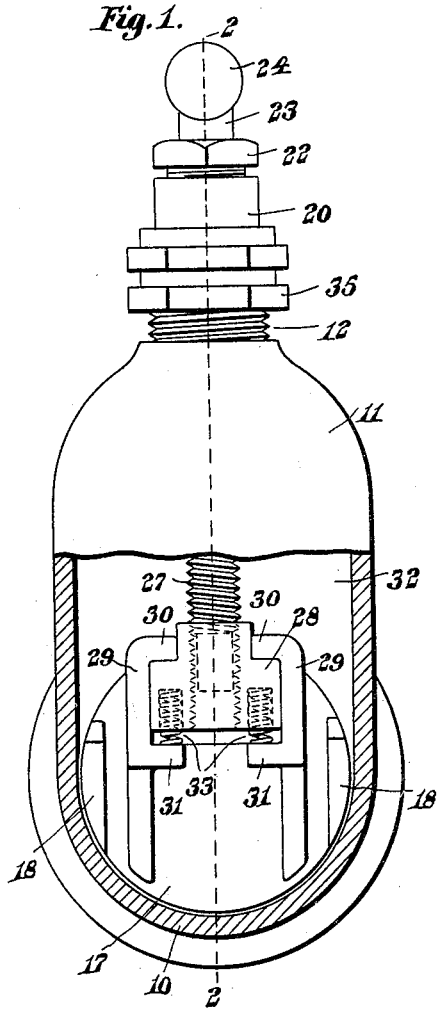
Figure 1 represents an elevation of a valve embodying the principles of the present invention, a portion thereof being shown in section, the cutting plane being on line 1, 1, on Fig. 2.
Figure 2:
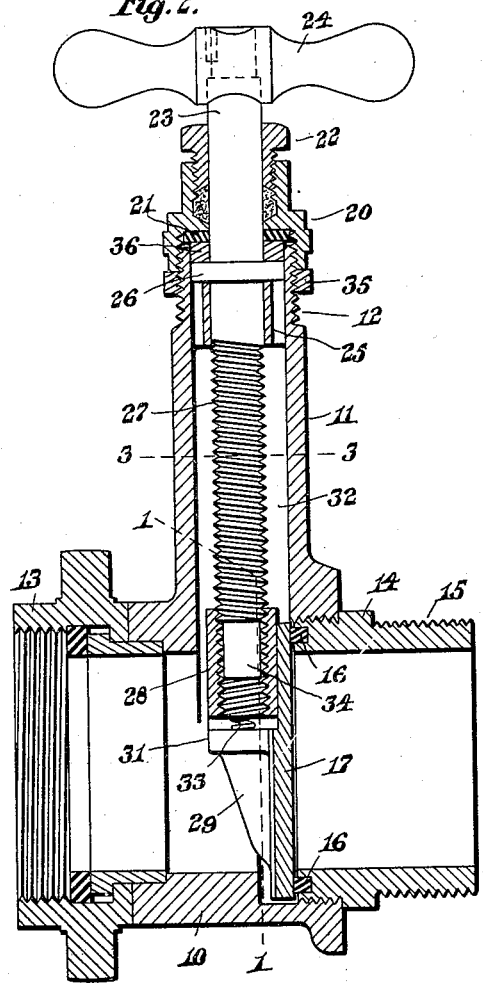
Figure 2 represents a vertical section of the same on line 2, 2, on Fig. 1.
Figure 3:
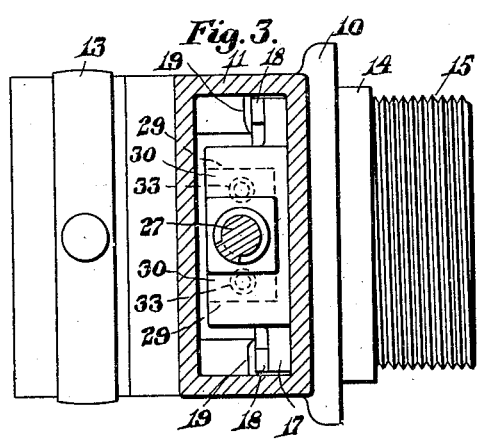
Figure 3 represents a horizontal section of same on line 3, 3, on Fig. 2.

In the drawings, 10 is a valve casing having extending upwardly therefrom a chambered extension 11, its upper end terminating in a tubular threaded portion 12.

Secured to one side of the casing 10 is a coupling member 13 by which the valve may be secured to the outlet of a hydrant or similar device as is the usual practice.

Threaded to the opposite side of the casing 10 is a short pipe 14 the outer end of which is threaded at 15 to receive a hose.

The inner end of this pipe 14 has a gasket 16 disposed in a groove in the end thereof and against which the gate 17 is adapted to bear.

The gate 17 has oppositely disposed wedge-shaped members 18 adapted to contact with the inclined faces of ribs 19 extending inwardly from the valve casing 10.

When the gate 17 is forced into closed position the wedge-shaped members 18 contacting the ribs 19 will force said gate into contact with the gasket 16 and effectually close the passage through the valve.

The tubular threaded portion 12 is closed by a cap 20, said cap having a resilient washer 21 therein bearing against the upper end of said tubular threaded portion 12.

The upper end of the cap 20 has a stuffing box 22 therein and through this stuffing box 22 extends a spindle 23 having keyed to its upper end a handle 24 by which it may be rotated about its axis.

Within the threaded portion 12 is a spider 25 through which said spindle 23 extends, said spindle 23 having a peripheral flange 26 adapted to bear against the upper end of said spider 25 to limit its inward movement.

The inner end of the spindle 23 is provided with a screw thread 27 which is adapted to coact with a nut 28 slidable between flanges 29 formed on and extending outwardly from one face of the gate 17.

This nut is T-shaped as shown in Fig. 1 of the drawings and is limited in its movement in opposite directions by the side branches thereof coming into contact with the inwardly projecting portions 30, 31 of said flanges 29.

Normally the nut 28 is in the position shown in Fig. 1 of the drawings with the upper faces of the side branches thereof in contact with the inward projections 30.

In this position one or two winds of the screw thread 27 is in engagement with the thread of the nut 28.

If the handle 24 is moved contra-clockwise, the action of the screw threads 27 upon the nut 28 will be to draw the gate 17 upwardly into the chamber 32 within the upward extension 11 of the valve casing 10.

The nut 28 is forced against the inward projections 30 by means of the springs 33, the upper ends of which extend into sockets formed in the lower end of the nut 28, while the lower ends of said springs bear against the inward projections 31.

When the handle 24 is moved clockwise to close the valve, the threaded portion or screw 27 of the spindle 23 will rotate in the nut 28 and cause said nut to be moved downwardly within the valve casing, the screw 27 being restrained from all end movement.

This downward movement of the nut 28 will be transmitted through the springs 33 to the gate 17 and cause said gate to be moved into its lowest position.

As soon as the gate reaches its lowest position and comes into contact with the lower wall of the valve casing, the continued rotation of the screw 27 will cause the nut 28 to be moved downwardly compressing the springs 33 until the nut threads are entirely disengaged from the screw threads 27 leaving the unthreaded end 34 within the nut 28 to prevent displacement thereof.

When in this position the handle 24 and screw 27 may be rotated clockwise without affecting any movement of the gate 17.

This is of great advantage, as it makes the valve fool-proof and no injury to the valve can be incurred by careless operators.

Heretofore, in valves of this character the screw 27 usually has been threaded to a projection formed upon the gate 17 and after the gate had reached its seat the operators frequently would continue to rotate the screw with the result that the gates would become buckled, broken or otherwise injured.

Such objections are wholly overcome by the construction shown and described herein by which the gate may be moved to its seat and no further.

When it is again desired to open the valve and the handle 24 is rotated contra-clockwise, the springs 33 will force the nut 28 upwardly until the threads of the nut 28 and screw 27 are again in engagement and then the continued rotation of the screw 27 contra-clockwise will raise the gate into the chamber 32.

For nice adjustments the cap 20 may be rotated upon the tubular threaded portion 12 and then retained in adjusted position by the lock nut 35.

Between the resilient washer 21 and the flange 26 of spindle 23 is disposed a metal washer 36.

It is believed that the operation and many advantages of the invention will be understood without further description.

Having thus described my invention, I claim:

1. The combination of a valve casing provided with a valve seat; a gate reciprocable transversely of said seat; gate-moving means adapted to be disconnected from said gate when said gate is in closed position; and means for connecting said gate and moving means preparatory to moving the gate into open position.

2. The combination of a valve casing provided with a valve seat; a gate reciprocable transversely of said seat and having parallel guide flanges on one face thereof; a nut between said guide flanges having limited movement relatively to said gate; an actuating screw restrained from end movement and coacting with said nut; and resilient means for forcing said nut into engagement with the thread of said screw preparatory to moving the gate into open position.

3. The combination of a valve casing provided with a valve seat; a gate reciprocable transversely of said sheet and having flanges on one face thereof; a spring-pressed nut between said flanges having limited movement relatively to said gate; and an actuating screw restrained from end movement and coacting with said nut, said screw having an unthreaded end extending into said nut when the gate is closed.

4. The combination of a valve casing provided with a valve seat; a gate reciprocable transversely of said seat and having flanges on one face thereof with separated inturned projections in the same vertical plane; a nut between said flanges having limited movement relatively to said gate between said projections; an actuating screw restrained from end movement and coacting with said nut; and springs adapted to force said nut toward the upper projections, the upper ends of said springs being disposed in sockets formed in said nut and the lower ends bearing against the lower projections.

5. The combination of a valve casing provided with a passage therethrough; a sliding gate for closing said passage; a nut movably mounted on said gate; a revoluble screw coacting with said nut for moving said gate and disconnected from said nut when the gate is in its closed position; and springs for forcing said nut into engagement with said screw when the latter is rotated in a direction to open the gate.

Signed by me at 746 Old South Bldg., Boston, Mass., this 14th day of May, 1928.

JOHN J. BARKER.